United States Patent
Gowreesunker et al.

(10) Patent No.: US 9,195,341 B2
(45) Date of Patent: Nov. 24, 2015

(54) TOUCHSCREEN CONTROLLER AND METHOD FOR CHARGER NOISE REDUCTION THROUGH NOISE SHAPING

(71) Applicant: Texas Instruments Incorporated, Dallas, TX (US)

(72) Inventors: Baboo Vikrhamsingh Gowreesunker, San Francisco, CA (US); Ranga Seshu Paladugu, Tucson, AZ (US); Jerry Lee Doorenbos, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 108 days.

(21) Appl. No.: 14/180,404

(22) Filed: Feb. 14, 2014

(65) Prior Publication Data
US 2015/0234519 A1    Aug. 20, 2015

(51) Int. Cl.
*G06F 3/045* (2006.01)
*G06F 3/041* (2006.01)
*G06F 3/044* (2006.01)

(52) U.S. Cl.
CPC ............. *G06F 3/0416* (2013.01); *G06F 3/044* (2013.01)

(58) Field of Classification Search
CPC ....... G06F 3/041; G06F 3/0418; G06F 3/044; G06F 3/0416; G09G 2320/0209
USPC ................. 345/173–178, 204–215; 178/18.01–18.07, 20.01–20.04
See application file for complete search history.

(56) References Cited

U.S. PATENT DOCUMENTS

| | | |
|---|---|---|
| 5,953,372 A | 9/1999 | Virzi |
| 6,385,210 B1 | 5/2002 | Overberg et al. |
| 6,738,048 B1 | 5/2004 | Rundel |
| 7,812,830 B2 | 10/2010 | Wang |
| 7,916,127 B2 | 3/2011 | Wang |
| 7,965,280 B2 | 6/2011 | Wang |
| 7,982,471 B2 | 7/2011 | Mueck et al. |
| 7,999,793 B2 | 8/2011 | Wang |
| 8,228,076 B2 | 7/2012 | Cormier, Jr. et al. |
| 8,269,745 B2 | 9/2012 | Fang et al. |
| 8,310,464 B2 | 11/2012 | Fang |
| 8,340,278 B2 | 12/2012 | Gowreesunker et al. |
| 8,605,054 B2 | 12/2013 | Krenik et al. |
| 2011/0123019 A1 | 5/2011 | Gowreesunker et al. |
| 2011/0169745 A1* | 7/2011 | Fang et al. ............. 345/173 |

(Continued)

FOREIGN PATENT DOCUMENTS

WO    2012040694 A2    3/2012

OTHER PUBLICATIONS

Texas Instruments, "TouchPath Capacitive Touch Screen Controller", TSC3060, SBAS575A, Nov. 2012, Revised Jan. 2013.

(Continued)

*Primary Examiner* — Vijay Shankar
(74) *Attorney, Agent, or Firm* — John R. Pessetto; Frank D. Cimino

(57) ABSTRACT

Touch screen controllers and methods are presented for removing charger noise and other high frequency noise from touch screens in the presence of aliasing in which a digital low pass filter rejects the high frequency noise, a noise tracker determines whether noise is being aliased into the low pass filter pass band, and a noise shaper artificially induces or modifies aliasing in the system by adjusting an analog-to-digital converter sampling frequency and/or a panel scan frequency to try to move the aliased noise outside the low pass filter pass band.

20 Claims, 7 Drawing Sheets

(56) References Cited

U.S. PATENT DOCUMENTS

| | | | |
|---|---|---|---|
| 2012/0056841 A1* | 3/2012 | Krenik et al. | 345/174 |
| 2012/0128168 A1 | 5/2012 | Gowreesunker et al. | |
| 2012/0293445 A1 | 11/2012 | Crandall et al. | |
| 2013/0050132 A1 | 2/2013 | Calpe Maravilla et al. | |
| 2013/0054233 A1 | 2/2013 | Unno et al. | |
| 2013/0063388 A1 | 3/2013 | Ningrat | |

OTHER PUBLICATIONS

Shannon, "Communication in the presence of noise", Proc. Institute of Radio Engineers, vol. 37, No. 1, pp. 10-21, Jan. 1949; Reprint as classic paper in: Proc. IEEE, vol. 86, No. 2, pp. 447-457, Feb. 1998.

Unser, "Sampling—50 years after Shannon", Proc. IEEE, vol. 88, No. 4, pp. 569-587, Apr. 2000.

* cited by examiner

TOUCHSCREEN CONTROLLER AND METHOD FOR CHARGER NOISE REDUCTION THROUGH NOISE SHAPING

FIELD OF THE INVENTION

The present disclosure relates to control apparatus and methods for operating touchscreen controllers to interface a touchscreen device with a host system.

BACKGROUND

Touchscreens have gained wide usage in a variety of applications such as smart phones, tablets, portable navigation devices, laptop and desktop computers, portable music players and other general user interfaces and consumer electronic devices, allowing users to intuitively select from prompted options and to perform other user interface operations by simply touching a display screen and a variety of ways. Different touchscreen technologies have been developed, including capacitive, surface capacitance, projected capacitance, resistive, surface acoustic wave touchscreens and others. Touchscreen controllers interface a touchscreen device and a host system, such as a microprocessor of a touchscreen-enabled tablet computer, and can be operated to detect actuations or touches of different locations on the display screen by a user. The touchscreen device is typically configured as an array of rows and columns, and user touches are detected by the controller providing excitation signals to row connections while sensing column connections of the touchscreen device in a panel scanning operation. As with other circuitry in battery-powered portable user devices, touchscreen controller performance and scanning the touchscreen panel can be affected by noise, particularly when connected to battery chargers, where chargers can couple noise into touchscreen devices thereby impacting the ability to detect user touch actuations. The frequency of touch signals are typically close to DC, such as about 10 Hz or less, and theoretically can be separated from the higher frequency charger noise by low-pass filtering. However, the separation is difficult in practice due to aliasing in a multi-rate sampling procedure involving analog-to-digital conversion sampling rates and panel scan rates. In a typical configuration, the touchscreen controller includes one or more analog-to-digital converters operating at a relatively high sampling frequency, with the panel scan operation being performed at a lower frequency. In practice, situations arise in which noise associated with charger operation is aliased into the pass band of a low pass filter, making it difficult to differentiate aliased noise from user touch occurrences. Accordingly, a need remains for improved touchscreen controllers and methods for addressing charger noise and other sources of high-frequency noise.

SUMMARY

Touchscreen controllers and methods are provided in which charger noise and other high frequency noise is selectively shaped to mitigate aliasing of the noise into the pass band of a low pass filter, thereby enhancing the ability to identify user touch occurrences. Digital processing circuitry detects whether noise is being aliased into a digital low pass filter pass band, and aliasing is modified by adjusting the analog-to-digital converter sampling frequency and/or a panel scan frequency to facilitate removal of the aliased noise from the low pass filter pass band. In this manner, if the current sampling and/or panel scan frequencies inhibit the ability of the low pass filter to effectively remove charger and other high-frequency noise, the controller can automatically reconfigure the scanning operation to facilitate user device operation while charging.

A touchscreen controller is provided, including an analog-to-digital converter operating at a sampling frequency to provide digital samples according to input signals received by controller sensing circuitry, and a digital low pass filter operating to filter the digital samples and to provide filtered digital samples for detecting user actuation of one or more portions of the touchscreen. The controller further includes a noise tracker which computes a first set of statistics corresponding to the digital samples output by the analog-to-digital converter and a second set of statistics corresponding to the filtered digital samples from the digital low pass filter. If the statistics indicate that noise is aliased into the pass band of the digital low pass filter, a noise shaper of the controller selectively adjusts the analog-to-digital converter sampling frequency and/or a panel scan frequency. In this manner, the controller facilitates reduction in detected high frequency noise aliased into the low pass filter pass band through selective noise shaping.

The statistics before and after the low pass filter can be computed by the noise tracker in a temporal fashion or in a spatial fashion in various embodiments, and may be of various forms such as standard deviations, mean values, etc. In certain embodiments, the noise tracker computes the statistics in a temporal fashion for individual nodes of the touchscreen for a plurality of panels scans both before and after low pass filtering. The noise tracker in certain embodiments employs thresholds for the first and second sets of statistics, and determines whether elements of the first set of statistics exceed a first threshold and whether elements of the second set of statistics exceed a second threshold, where the thresholds may be the same in certain embodiments, and may be adjustable by the controller. In certain implementations, the noise tracker causes the noise shaper to selectively adjust the sampling frequency and/or panel scan frequency if, for a given touchscreen node, the corresponding value of the first set of statistics exceeds the first threshold value and the corresponding value of the second set of statistics exceeds the second threshold value. Spatial statistics may be used for noise tracking in various embodiments, corresponding to a plurality of the touchscreen nodes for a single panel scan, with first and second sets of statistics being computed for the digital values and compared to thresholds before and after the low pass filter, respectively. In this manner, the noise tracker can detect situations in which the low pass filter is not effective in rejecting high-frequency noise, and initiate noise shaping adjustment by the noise shaper.

In certain implementations, the process is repeated multiple times until the aliased noise is moved sufficiently out of the low pass filter pass band or until a predetermined number of values for the adjusted sampling frequency and/or panel scan frequency have been tried without success, in which case the controller may notify the host system. In further embodiments, moreover, the controller may selectively adjust one or both of the threshold values during the adjustment process, and discontinue noise shaping adjustment of the sampling frequency and/or panel scan frequency if the predetermined number of frequency values have been tried for different thresholds without changing the results of the threshold comparisons.

Methods are provided for mitigating a high-frequency noise aliasing in a touchscreen controller, as well as non-transitory computer readable mediums with computer executable instructions for performing the methods in accordance with further aspects of the disclosure. The methods involve sequentially obtaining a series of digital sample sets of input signals from a connected touchscreen at a panel scan frequency using an analog-to-digital converter, as well as filtering the digital samples using a digital low pass filter. The methods further involve computing a first set of statistics corresponding to the samples from the analog-to-digital converter and computing a second set of statistics corresponding to the filtered digital samples from the digital low pass filter, and selectively adjusting the sampling frequency and/or the panel scan frequency if the first and second sets of statistics indicate the presence of noise aliased into the pass band of the digital low pass filter. Certain embodiments of the methods include comparing the first and second sets of statistics with corresponding first and second threshold values and selectively adjusting the sampling frequency and/or the panel scan frequency if, for a given touchscreen node, the corresponding value of the first set of statistics is greater than the first threshold value and a corresponding value of the second set of statistics is greater than the second threshold value.

DESCRIPTION OF THE VIEWS OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
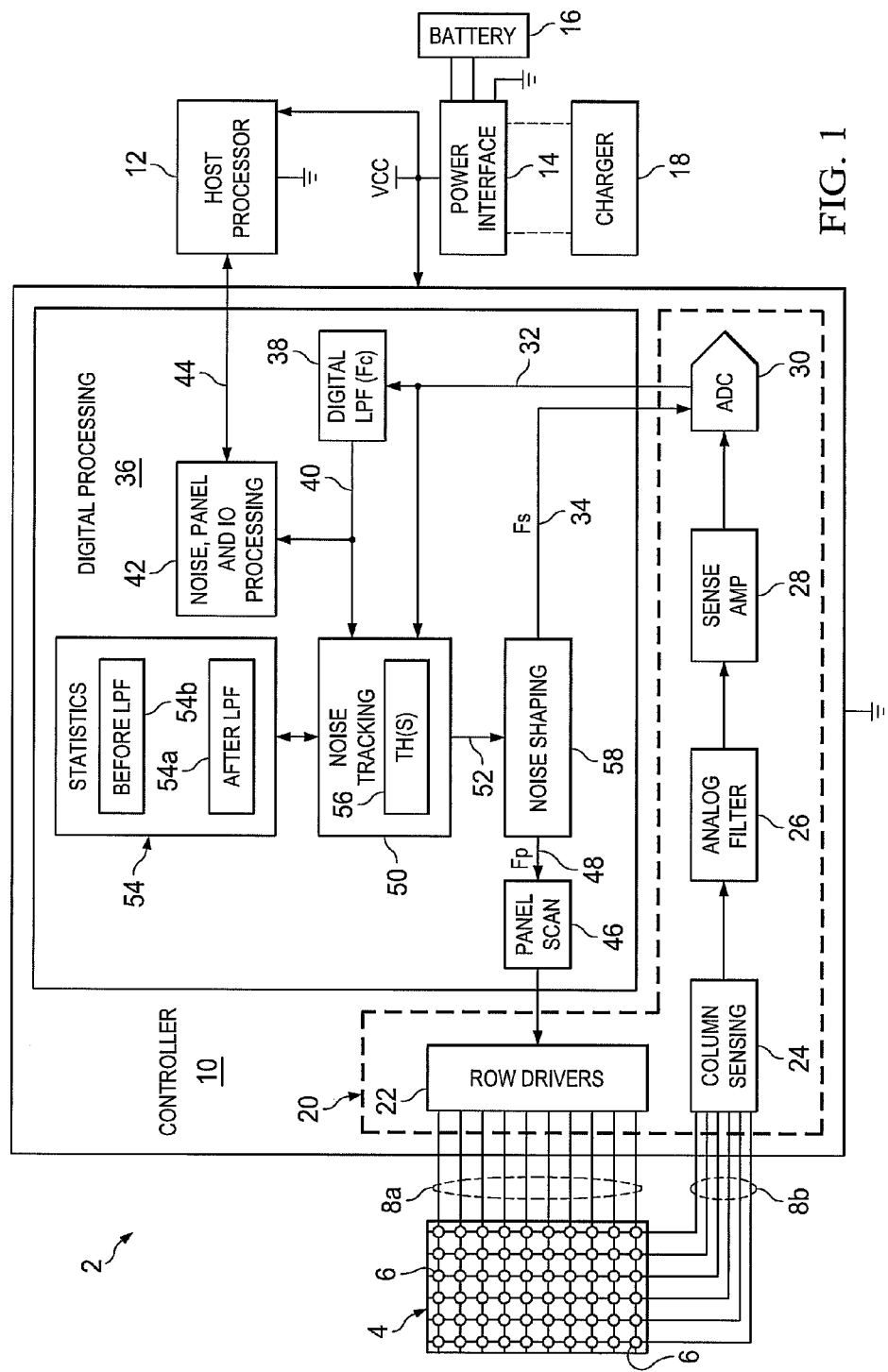
FIG. 1 is a schematic system diagram illustrating an exemplary controller interfacing a touch screen device to a host processor, with onboard noise tracking and noise shaping to remove charger noise from a digital low pass filter pass band according to one or more aspects of the present disclosure.

One or more embodiments or implementations are hereinafter described in conjunction with the drawings, wherein like reference numerals are used to refer to like elements throughout, and wherein the various features are not necessarily drawn to scale. The present disclosure provides techniques and touchscreen control apparatus by which the adverse effects of aliased noise caused by battery chargers and other sources of high-frequency noise can be mitigated in an automated fashion through selective noise shaping implemented in a touchscreen controller in response to detection of aliased noise in a low pass filter pass band. The various techniques of the present disclosure can be employed in connection with controllers for interfacing any type of touchscreen device with a host system, including without limitation capacitive touchscreens. Moreover, the touchscreen controllers may be implemented in any suitable form, including without limitation integrated circuit touchscreen controllers for use in consumer products, industrial user interfaces, military equipment or other applications.

FIG. 1 illustrates an exemplary system 2 with a touchscreen device 4 having an array of nodes or spatial sampling points or locations 6 configured in rows and columns with corresponding electrical row connections 8a and column connections 8b to electrical couple with a touchscreen controller 10 for interfacing with a host processor 12. In the illustrated example, the touchscreen device 4 is a capacitive touchscreen with 10 rows and 6 columns, where the array of 60 nodes 6 forms a touchscreen panel to register one or more types of single or multiple touch operations that may be performed by a user by physical interaction with a display screen of the device 4. As is known, the touchscreen device 4 may include display components operable to display a variety of visual renderings to a user, and user actuation of one or more portions of the touchscreen 4 can be selectively detected by providing driver or excitation signals to the row connections 8a and sensing corresponding input signals from the column connections 8b. In a capacitive touchscreen example, for instance, the device 4 includes a transparent window layer and a touch panel layer with interleaved rows and columns separated by a dielectric material, where an LED, LCD or other type of display panel renders visual images that can be viewed through the polarizing, touch panel and window layers (not shown). In this form of touchscreen 4, user physical interaction with the transparent window layer changes electrostatic fields created by excitation signals on the row connections 8a, and the controller 10 senses the input signals through connections 8b to assess one or more locations at which the user is pressing the touchscreen 4. The system 2 may be powered by a battery 16, such as for a portable user device (e.g., touchscreen-enabled laptop computer, smart phone, tablet, etc.), with a power interface 14 providing power from the battery 16 to the host processor 12 and the controller 10, and alternatively allowing power to be provided from an external source via a charger 18 for charging the battery 16 and/or for operating the host processor 12 and the touchscreen controller 10. As previously noted, however, battery chargers 18 and other sources in or near the system 2 may couple high-frequency noise into the touchscreen device 4.

As further shown in FIG. 1, the exemplary touchscreen controller 10 includes an analog circuit 20 or analog front end including row driver circuitry 22 and column sensing circuitry 24 for interconnection with the rows and columns of the touchscreen device 4, respectively. The column sensing circuitry 24 may include analog multiplexing by which multiple sensed column lines can be provided through an analog signal chain for ultimate conversion to digital values or samples. In the illustrated example, the column sensing circuit 24 provides an analog signal output to an analog filter 26 (e.g., an anti-aliasing low pass filter with a cutoff frequency of about 250 KHz in one example) whose output is provided to an adjustable sense amplifier circuit 28. The amplifier output is provided as an input to an analog-to-digital converter (ADC) 30 which operates at a sampling frequency 34 (Fs) to provide digital samples 32 according to sampled input signals received by the sensing circuit 24. Operation of the row drivers 24 and the column sensing circuit 24 is controlled by a panel scan controller 46 to implement panel scanning to sequentially obtain a series of sets of digital samples 32 at a panel scan frequency 48 (Fp), with the individual digital sample sets corresponding to a plurality of locations on the touchscreen 4.

A digital processing circuit 36 receives the digital samples 32 from the analog-to-digital converter 30, which can be any suitable programmed processor, logic circuit, etc. The processing circuit 36 is programmed or otherwise configured to implement the panel scan control functions of a scan controller 46 to operate the row drivers 22 and column sensing circuitry 24, as well as to perform other functions for interfacing the touchscreen 4 with a host processor 12 by which user inputs to the touchscreen device 4 are relayed to the host 12. In certain embodiments, moreover, one or more operating parameters of the analog circuit 20 may be programmable, such as configuration of one or more low pass filters in the analog filter circuitry 26, a programmable gain and/or offset of the sense amplifier 28 and the sampling frequency 34 of the analog-to-digital controller 30. The controller 10 in certain embodiments is operable in various different modes under control of the host processor 12, such as idle or sleep modes, a panel scan mode, and a monitoring scan mode for low-power touch sensing to assess changes in self-capacitance of the touch screen columns for selective transition into the panel scan mode. The digital processing circuitry 36 further implements a digital low pass filter 38 with a pass band from DC to a cutoff frequency Fc which filters the digital samples 32 from the analog-to-digital converter 30 and provides filtered digital samples 40 for use in detecting user actuation of one or more portions of the touchscreen 4. The filtered digital samples 40 are provided to a node, panel and I/O processing component 42 which implements $I^2C$ or other suitable form of communications via suitable connection 44 with the host processor 12.

In accordance with one or more aspects of the present disclosure, moreover, the digital processing circuit 36 includes a noise tracker 50 and a noise shaper 58 configured to detect whether high-frequency noise is aliased into the pass band of the digital low pass filter 38 and to selectively adjust one or both of the sampling frequency Fs 34 of the analog-to-digital converter 30 and the panel scan frequency Fp 48 of the panel scan circuit 46. A panel scan refers to sampling of multiple nodes or spatial sensing locations 6 of the touchscreen device 4, and the panel scan frequency 48 is the reciprocal of the time between panel scans. As previously noted, the illustrated analog circuit 20 provides analog multiplexing or other suitable configuration of the column sensing circuit 24 in order to utilize a single analog signal chain with a single analog-to-digital converter 30, and thus the panel scan circuitry 46 operates to selectively excite or drive individual rows via the road drivers circuit 22 in the connections 8a and to sense specific ones of the touchscreen columns via the column sensing circuit 24 and the connections 8b, which scanning can be done by any suitable scanning algorithm to detect user actuation of specific spatial locations on the touchscreen 4.

The noise tracker 50 in the illustrated embodiment provides a noise flag 52 which can be any suitable signal or value in order to cause the noise shaper 58 to selectively adjust one or both of the frequencies 34, 48 to facilitate reduction in detected aliasing of high-frequency noise into the pass band of the digital low pass filter 38. In this regard, certain embodiments of the noise tracker 50 compute various statistics 54 based on the original digital samples 32 from the analog-to-digital converter 30 and on the filtered digital samples 40 from the digital low pass filter 38 (a first set of before LPF statistics 54b and a second set of after LPF statistics 54a in FIG. 1). The noise tracker 50 selectively provides the noise flag 52 to the noise shaper 58 if the computed statistics 54 indicate the presence of noise aliased into the pass band of the digital low pass filter 38. In this manner, the controller 10 selectively response to particular situations in which noise from the charger 18 or other high frequency noise source, although outside the pass band defined by the cutoff frequency Fc of the digital low pass filter 38, is nevertheless being aliased into the pass band by operation of the panel scanning at the frequency Fp and the higher rate sampling at the sampling frequency Fs of the analog-to-digital converter 30. In this regard, the sampling frequency Fs is typically much higher than the panel scan frequency Fp, and the frequencies Fs and Fp are significantly higher than the cutoff frequency Fc of the digital low pass filter 38, where Fc is typically set to pass only low frequencies in the typical touch signal frequency range of about 10 Hz or less, with a single analog-to-digital converter 30 operating at a sampling frequency Fs up to around 4 MHz for sampling 60 nodes 6 of the touchscreen 4 for a panel scan frequency Fp of about 50-400 Hz. In practice, chargers 18 can couple noise ranging from 50 Hz to hundreds of kHz into the touchscreen device 4, and inexpensive chargers 18 can couple high frequency voltages of 10 V peak-to-peak or more.

Absent countermeasures such as the intelligent noise tracking and shaping contemplated by the inventors, aliasing is commonly introduced into the node data due to the multi-rate sampling nature of touch screen controllers. Moreover, the inventors have appreciated that aliasing becomes of concern only in the presence of noise, with touch detection being inhibited if noise is aliased into the same spectral band as a touch signal. For example, the input signal is band limited to a maximum frequency Fmax by the anti-aliasing filter 26 in the analog circuit 20, while the samples are obtained via the converter 30 at a rate of Fs, where Fs is typically much higher than Fmax causing aliasing according to the Shannon-Nyquist Sampling Theory.

Moreover, a second sampling occurs due to the panel scan, where each node can be sampled in a time-multiplexed fashion with the panel scan frequency or rate Fp typically being much lower than the converter sampling frequency Fs. In this case, signals in the [0, Fs/2] range will be aliased down to the [0, Fp/2] range, and it is possible that the data is aliased twice, first to the [0, Fs/2] range, and again into the [0, Fp/2] frequency range.

The noise tracker 50 and the noise shaper 58 can be employed to address such multiple aliasing situations as well as cases where aliasing happens only once (either due to sampling only, or due to panel scanning only). The exemplary noise tracker 50 computes the first set of statistics 54b corresponding to the digital samples 32 from the converter 30 (before the low pass filter 38) as well as the second set of statistics 54*a* corresponding to the filtered digital samples 40 after the low pass filter 38. If the statistics 54 indicate the presence of noise aliased into the pass band of the digital low pass filter 38, the noise tracker 50 activates the noise flag 52 to cause the noise shaper 58 to adjust one or both of the converter sampling frequency 34 (Fs) and/or the panel scan frequency 48 (Fp) used by the panel scan control component 46 to provide noise shaping.

Figure 2:
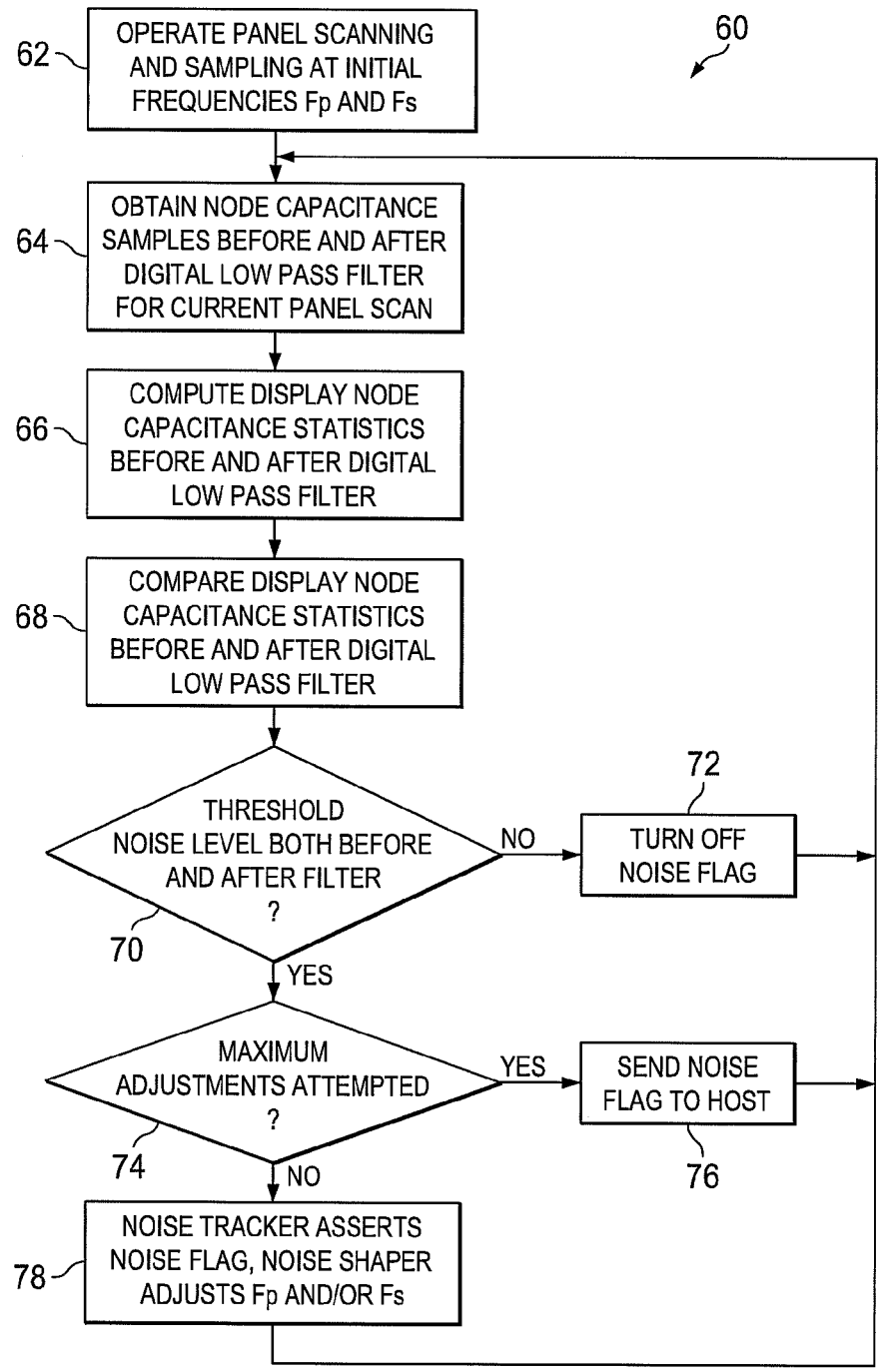
FIG. 2 is a flow diagram illustrating an exemplary method for noise shaping high frequency aliased noise in a touch screen controller according to further aspects of the disclosure.

Referring also to FIG. 2, a process or method 60 is illustrated for mitigating high-frequency noise aliasing in a touchscreen controller, which may be implemented via the noise tracker 50 and the noise shaper 58 in the controller 10. Although the exemplary method 60 is illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, processor-executed firmware, FPGAs, logic circuitry, etc. or combinations thereof, for example, in the digital processing circuit 36 of the controller 10 in order to provide the noise shaping functionality described herein.

The controller 10 performs panel scanning and sampling at 62 in FIG. 2 using initial panel scan and sampling frequencies 48 and 34 (Fp and Fs), respectively, with the node, panel and I/O processing circuitry 42 using the collected filtered samples 40 to identify any discernible user touches of the touchscreen 4. Any suitable processing algorithms can be used for detecting one or more user touches, and the controller 10 reports any identified touch inputs to the host processor 12 via the communications connection 44. In one possible implementation, the processing circuitry 42 receives the sample values 40 and may perform adjustment by subtracting calibration data and identifying one or more peaks (e.g., the highest four peaks) for interpolation processing using a linear approximation to produce X and Y coordinates for a touch, with Z values reported as the magnitudes of the peaks used to interpolate the XY location (node location 6) on the touchscreen 4.

At 64 in FIG. 2, the noise tracker 50 (FIG. 1) obtains the node capacitance samples 32, 40 before and after the digital low pass filter 38 for the current panel scan operation, and computes displayed node capacitance statistics 54 both before and after the digital low pass filter at 66, where the computed statistics may be temporal or spatial in various implementations. In the illustrated embodiment, the tracker 50 computes the first set of statistics 54*b* for the data samples 32 preceding (before) the digital low pass filter 38, and computes the second set of statistics 54*a* for the data samples 40 following (after) the digital low pass filter 38. In one non-limiting example, the noise tracker 50 computes the statistics in a temporal fashion as standard deviation values for individual nodes 6 of the touchscreen 4 for a plurality of panels scans both before and after low pass filtering, and the computation at 66 is an update of the statistics computed over an integer number of scans, such as 500. Other embodiments are possible in which different forms and types of statistics are computed at 66, such as mean or average values. In the illustrated embodiment, moreover, the noise tracker 50 stores and maintains one or more threshold values 56, and determines whether elements of the first set of statistics 54*b* individually exceed a first threshold 56*b*, and also determines whether elements of the second set of statistics 54*a* exceed a second threshold 56*a*. In various embodiments the threshold values 56*b* and 56*a* can be the same value, and the thresholds 56 can be adjustable by the controller 10, automatically and/or under control of the host processor 12.

At 68 in FIG. 2, the noise tracker 50 compares the display node capacitance statistical values 54*b* (before low pass filtering) and 54*a* (after low pass filtering) to the corresponding threshold values 56*b* and 56*a*, and determines at 70 whether, for a given touchscreen node, the corresponding value of the first set of statistics 54*b* exceeds the first threshold value 56*b* and the corresponding value of the second set of statistics 54*a* exceeds the second threshold value 56*a*. If not (NO at 70), the noise tracker 50 turns off the noise flag 52 (if previously turned on), and the process 60 returns to obtain further samples at 64 as described above.

Figure 3:
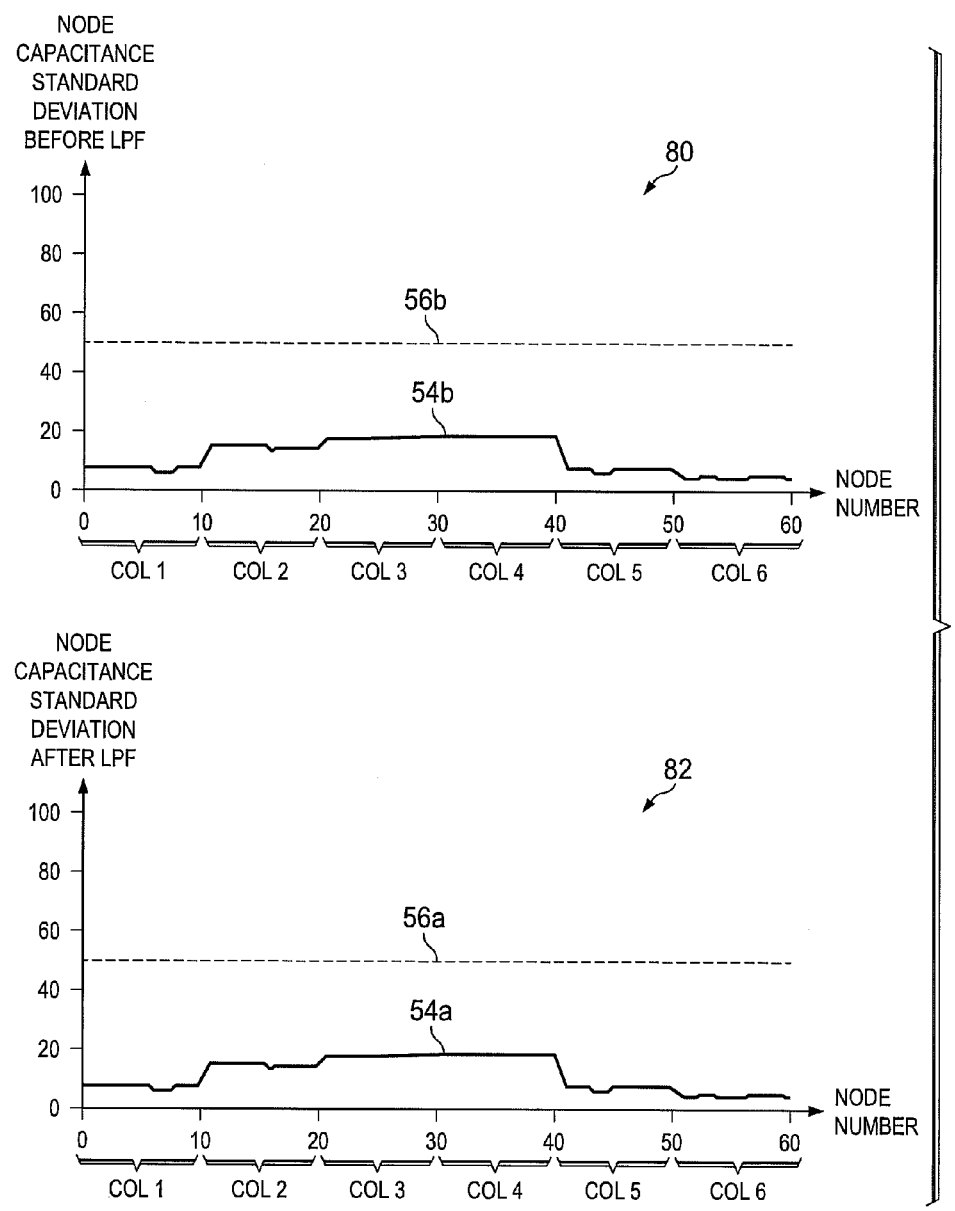
FIG. 3 illustrates standard deviation graphs for node capacitance values of the touch screen in FIG. 1 both before and after the digital low pass filter in the presence of noise with no user touches.

Referring also to FIG. 3, graphs 80 and 82 illustrate exemplary node capacitance standard deviation statistical values 54*b* and 54*a* (from 0 through 100% of a predetermined range) for each of the 60 numbered nodes 6 of the touchscreen 4, along with the corresponding threshold values 56*b* and 56*a* shown in dashed lines, where the numbered nodes 6 are grouped into six sets of nodes corresponding to the six columns of the exemplary touchscreen 4 (COL1, COL2, COL3, COL4, COL5 and COL6 in FIG. 3). In the situation shown in FIG. 3, the standard deviation values 54*b* for all nodes are all well below the corresponding pre-low pass filtering threshold 56*b*, and a similar situation is seen in the post-filtering standard deviation values 54*a* which are below the corresponding second threshold 56*a*. In this situation, the user is not touching the touchscreen 4, and the noise tracker 50 does not infer presence of aliased noise in the pass band of the digital low pass filter 38.

Figure 4:
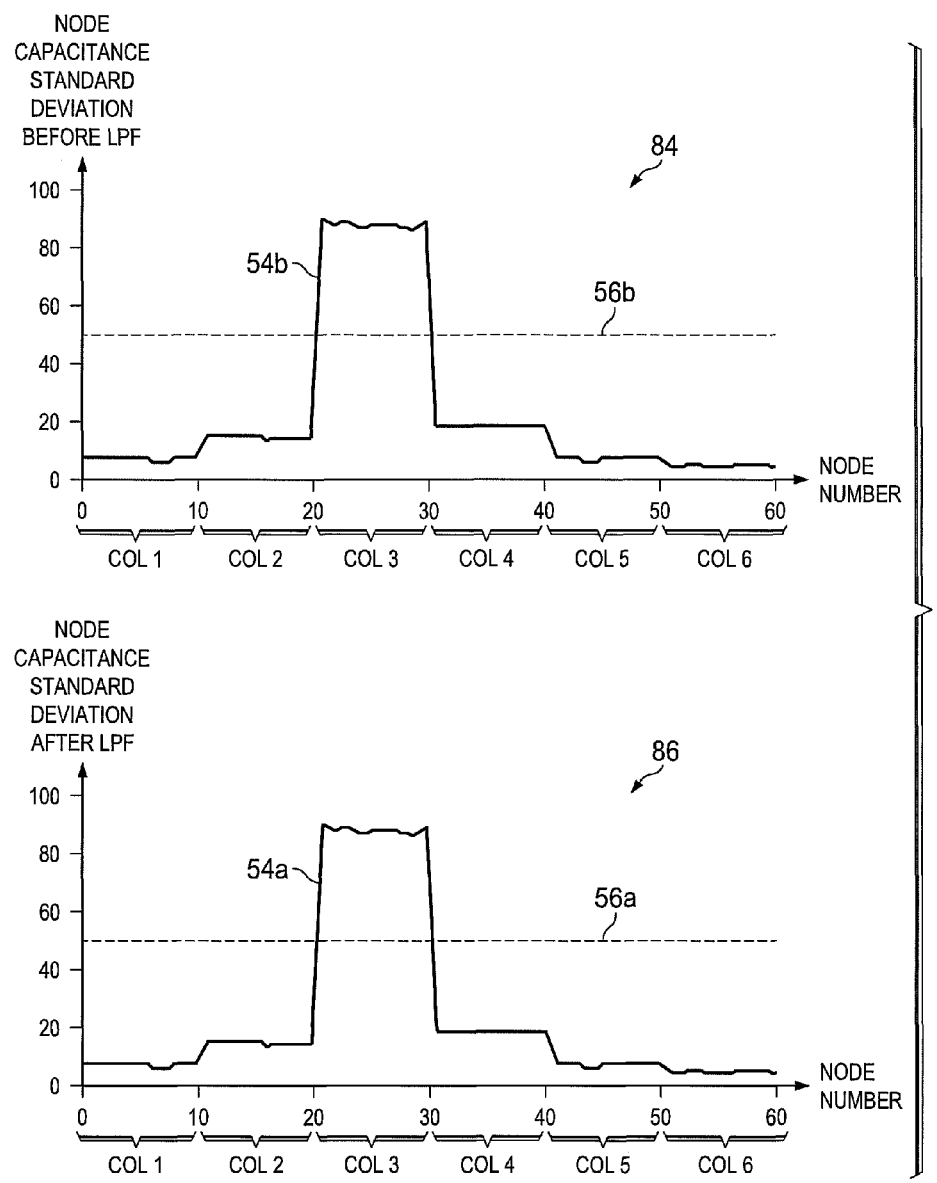
FIG. 4 illustrates standard deviation graphs for node capacitance values of the touch screen in FIG. 1 in the presence of noise and user touching in a third column where high frequency battery charger noise is aliased into the low pass filter pass band and exceeds threshold levels both before and after the digital low pass filter.

Referring to FIGS. 2 and 4, the noise tracker 50 again obtains node capacitance samples both before and after the digital low pass filter 38 at 64 in FIG. 2, computes or updates the standard deviation statistics 54 at 66, and compares the statistics before and after the digital low pass filtering with the corresponding threshold values 56 at 68. Graphs 84 and 86 in FIG. 4 illustrate a different statistical situation in which a user is actuating the touchscreen 4 and noise (e.g., from the charger 18 in FIG. 1) is aliased into the pass band of the low pass filter 38 (see also graph 96 in FIG. 7 below). As seen in the graph 84 of FIG. 4, the standard deviation values 54*b* for the nodes 20-30 of the third touchscreen column (COL 3) exceed the first threshold value 56*b* for the pre-filtering samples 32 from the converter 30. Also, the post-filtering statistical values 54*a* for nodes 20-30 exceed the second threshold value 56*a* in graph 86. In this case, the noise tracker 50 determines (YES at 70 in FIG. 2) that the threshold noise level has been reached or exceeded both before and after the digital low pass filter 38, and accordingly concludes that high-frequency noise is aliased into the pass band of the digital low pass filter 38. A determination is made by the noise tracker 50 at 74 in FIG. 2 as to whether a predetermined maximum number of adjustments have been attempted. When this is not the case (NO at 74), the noise tracker asserts the noise flag 52 and the noise shaper 58 adjusts one or both of the sampling frequency 34 (Fs) of the analog-to-digital converter 30 and/or the panel scan frequency 48 (Fp) used by the panel scan controller 46 at 78 in FIG. 2.

Figure 5:
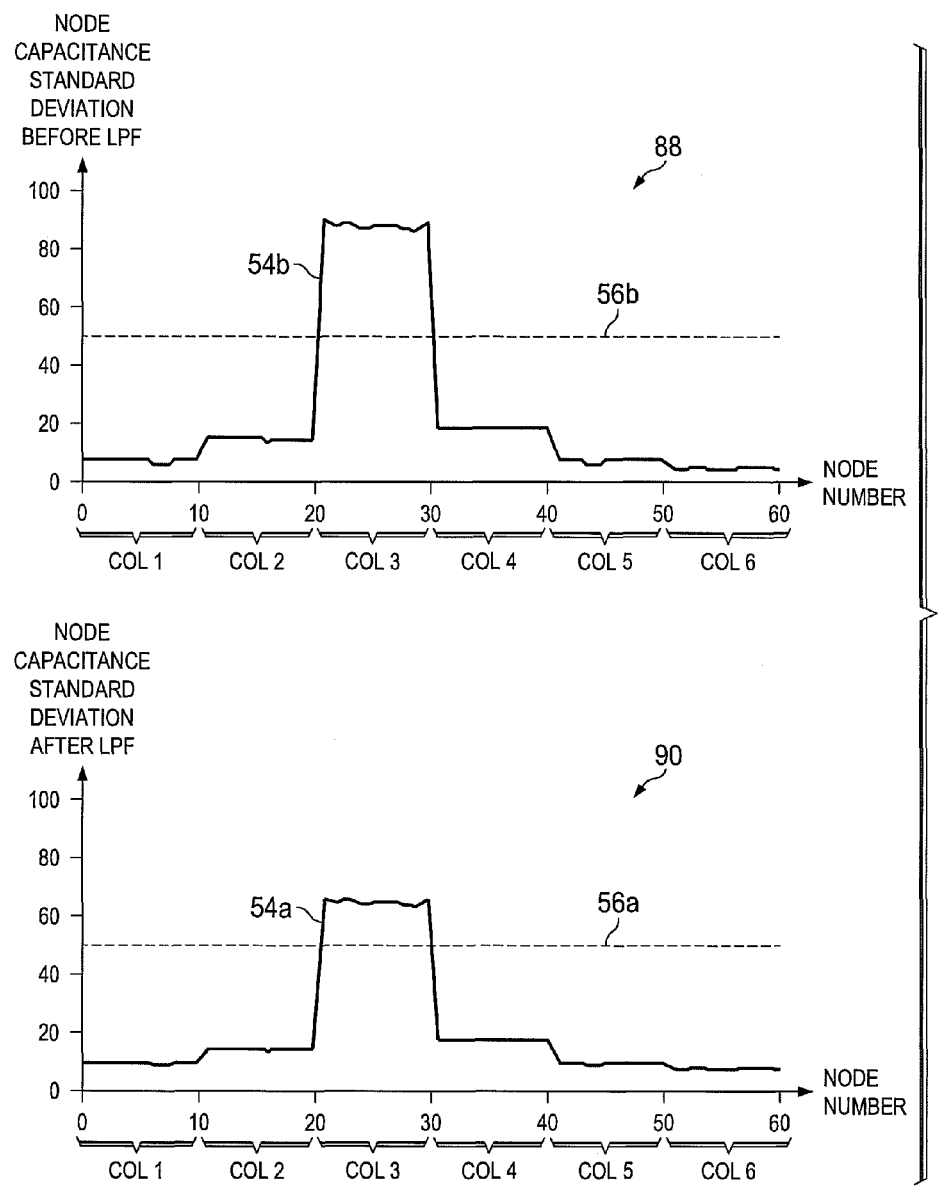
FIG. 5 illustrates pre and post filter standard deviation graphs for node capacitance values of the touch screen in FIG. 1 in the presence of noise and user touching in the third column after adjustment of the panel scan frequency to modify the noise aliasing.

Referring also to FIG. 5, the process 60 is then repeated at 64-70 as described above, with the noise tracker 50 again determining whether a threshold noise level is seen both before and after the low pass filter 38 using the updated sampling frequency 34 and/or panel scan frequency 48. FIG.

5 shows graphs 88 and 90 in which the standard deviation values 54*b* before the digital low pass filtering are at roughly the same levels as in FIG. 4, but the adjustment of the sample frequency and/or panel scan frequency by the noise shaper 58 have reduce the post-filtering standard deviation values 54*a* for the touched nodes 20-30. As seen in graph 90, for example, these value still exceed the second threshold value 56*a*, but are significantly reduced compared with those seen in the graph 86 of FIG. 4. At this point, since the threshold amounts of noise are still seen both before and after the digital low pass filtering (YES at 70 in FIG. 2), the noise tracker again determines at 74 whether the maximum number of adjustments have been attempted at 74, and if not (NO at 74), again asserts the noise flag 52 to cause the noise shaper 58 to adjust one or both of the frequencies 34 and/or 48. This processing may be repeated a number of times until the aliased noise is moved sufficiently out of the low pass filter pass band or until a predetermined number of values for the adjusted sampling frequency and/or panel scan frequency have been tried without success (YES at 74 in FIG. 2), in which case the controller 10 sends a noise flag to the host processor 12 at 76 in FIG. 2.

Figure 6:
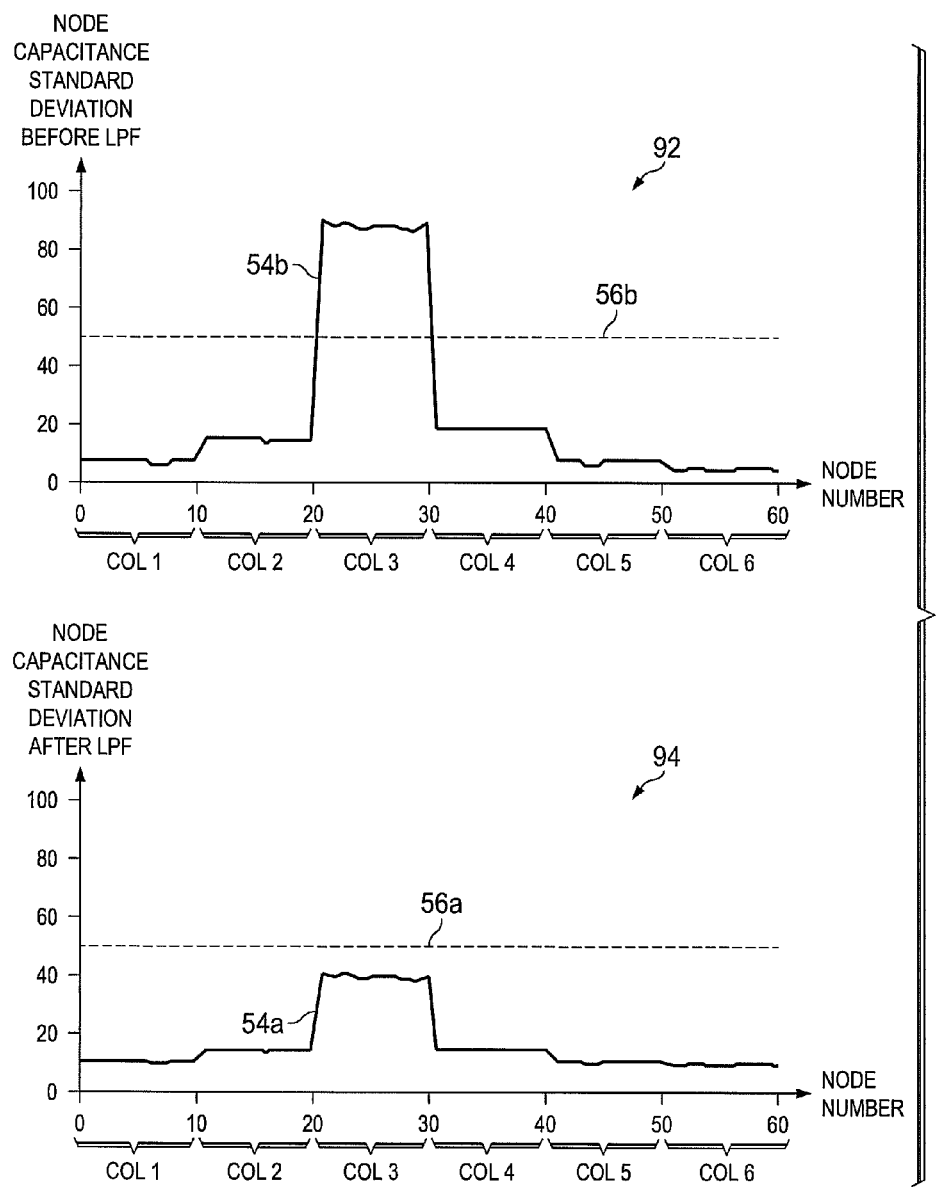
FIG. 6 illustrates pre and post filter standard deviation graphs subsequent to further panel scan frequency adjustment by the touch screen controller of FIG. 1 causing the standard deviation values after the low pass filter to fall below the threshold indicating successful automatic movement of charger noise outside the pass band of the digital low pass filter.

Referring also to the graphs 92 and 94 and FIG. 6, the further adjustment of one or both of the sampling frequency 34 and the panel scan frequency 48 in the illustrated example results in reduction of the post-filtering standard deviation values 54*a* below the second threshold value 56*a*, as seen in the graph 94. Accordingly, the noise tracker determines at 70 that the high-frequency noise from the charger 18 has now been successfully shaped out of the pass band of the low pass filter 38 (NO at 70 and FIG. 2), and accordingly turns off the noise flag 52 at 72. In this manner, the operation of the noise tracker 50 and the noise shaper 58 have successfully adjusted the aliasing of the system such that the adjusted operation of the digital-to-analog converter 30 and the panel scan controller 46 can better identify actual user touches of the touchscreen 4 in the presence of noise during operation of the battery charger 18. As seen in FIG. 2, moreover, the controller 10 proceeds in this operating mode, making selective adjustments as needed via the noise tracker 50 and the noise shaper 58 to automatically adapt to changing noise conditions in the system 2.

The noise shaper 58 can implement any suitable form of adjustment to one or both of the operating frequencies 34 and 48 of the converter 30 and the panel scan controller 46. In one non-limiting example, the noise shaper 58 causes the panel scan controller 46 to adjust the panel scanning frequency 48 by a certain amount ($\Delta Fp$), which is calculated based on Fp and Fs. Alternatively or in combination, the noise shaper 58 can send a certain change amount (e.g., $\Delta Fs$) to the converter 30, and may calculate the change amount based on one or more operating parameters, the statistics 54, or other variables. In another possible implementation, the noise shaper 58 is configured with an integer number of predetermined values for one or both of the frequencies 34 and/or 48, and selectively makes adjustments (at 78 in FIG. 2) in response to assertion of the noise flag 52 by the noise tracker 50, and once a certain number of the values (or combinations of a set of frequency values 34 with a set of multiple frequency values 48) have been attempted without success (YES at 74 in FIG. 2), the controller 10 may discontinue the selective noise shaping and take one or more reporting and/or remedial actions, such as sending a noise flag at 76 to the host processor 12. The host 12, in turn, may take one or more actions, such as notifying the user to disconnect the battery charger 18, etc.

In certain embodiments, moreover, the controller 10 may selectively adjust (e.g., raise or reduce) one or both of the threshold values 56*b* and/or 56*a* as part of the selective noise shaping if the predetermined number of values for one or both of the sampling frequency 34 and the panel scan frequency 48 have been tried without changing the threshold comparison results, in order to further attempt to find a combination which successfully moves all or at least part of the high-frequency aliased noise from the pass band of the digital low pass filter 38. Also, the noise tracker 50 may discontinue causing the noise shaper 58 to adjust one or both of the frequencies 34, 48 if the predetermined number of frequency values 34, 48 have been tried for different thresholds 56 without changing the results of the threshold comparisons.

Figure 7:
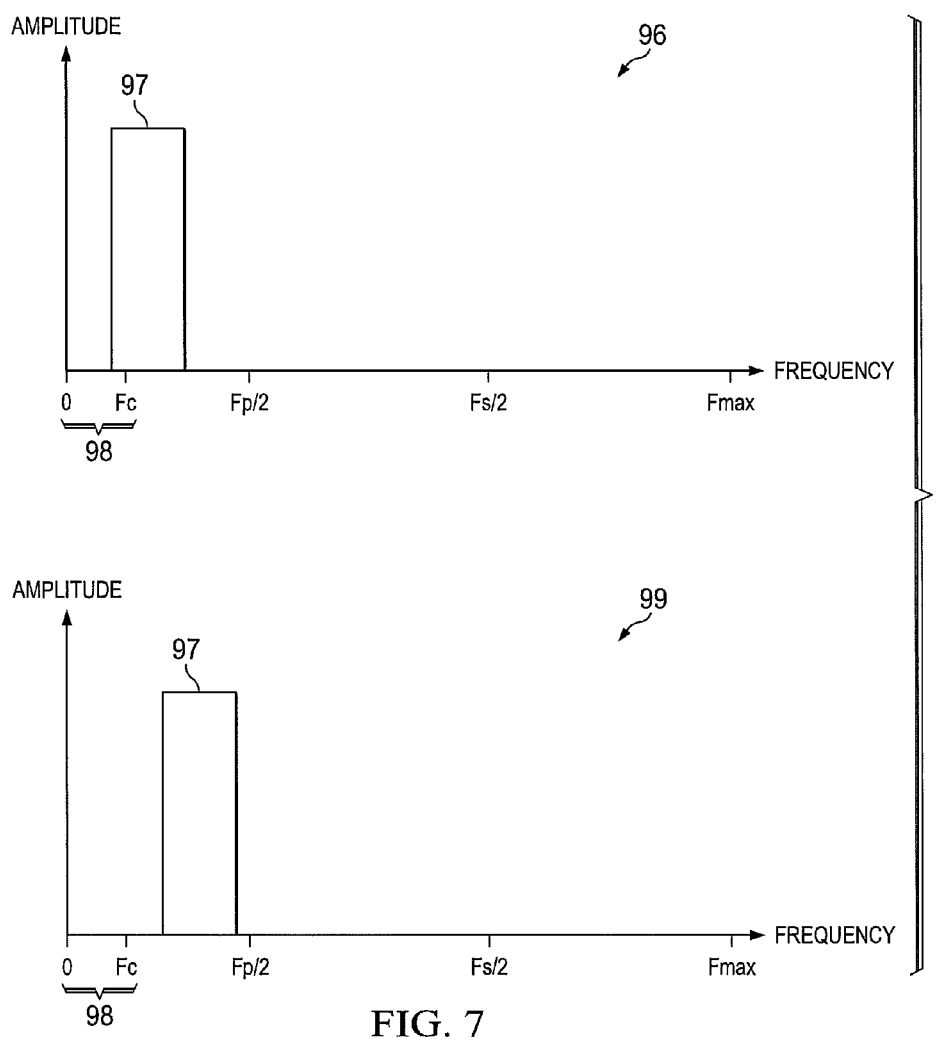
FIG. 7 illustrates frequency spectrum graphs showing high frequency charger noise aliasing initially within the low pass filter pass band and subsequent noise shifting by the noise shaper in FIG. 1 to move the aliased charger noise outside the low pass filter pass band.

Referring also to FIG. 7, a graph 96 illustrates a frequency spectrum of high frequency charger noise 97 aliasing initially within a pass band 98 of the digital low pass filter 38. As noted above, the noise tracker 50 performs statistical analysis and threshold comparisons to detect whether the noise 97 is aliased inside the pass band 98 of the filter 38, and if so causes the noise shaper 58 to adjust one or both of the frequencies 34, 48 to modify the system aliasing. Graph 99 in FIG. 7 illustrates subsequent noise shifting by the noise shaper 58 leading to movement or shifting of the aliased charger noise 97 outside the low pass filter pass band 98.

As previously noted, the noise tracker 50 may alternatively compute and employ spatial statistics 54 for noise tracking in various embodiments. In one possible example, the noise tracker 50 computes one or more mean values, standard deviation values, or other suitable statistical values 54 corresponding to a plurality of the touchscreen nodes 6 for a single panel scan, with first and second sets of statistics 54*b* and 54*a* being computed for the digital values 32 and 40, respectively before and after the low pass filter 38. For example, the noise tracker 50 may compute a single statistical value 54*b* for all the nodes 6 of the touchscreen 4 scanned in a single panel scan operation based on the pre-filtering samples 32 from the analog-to-digital converter 30, and may similarly compute a single statistical value 54*a* for all the touchscreen nodes 6 in the same panel scan operation based on the post-filtering samples 40. In this case, the noise tracker 50 compares the first value 54*b* with the first threshold value 56*b*, compares the second statistical value 54*a* with the second threshold 56*a*, and selectively causes the noise shaper 58 to adjust one or both of the frequencies 34, 48 if both the statistical values 54 exceed their corresponding threshold 56.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A controller for interfacing a touch screen with a host system, the controller comprising:
   a driver circuit operative in a scan mode to selectively provide one or more excitation signals to a connected touch screen;
   a sensing circuit operative in the scan mode to receive a plurality of input signals from the connected touch screen;

an analog-to-digital converter operating at a sampling frequency to provide digital samples according to sampled input signals received by the sensing circuit;

a digital low pass filter with a pass band defined by a cutoff frequency and operative to filter the digital samples and to provide filtered digital samples for detecting user actuation of one or more portions of the touch screen;

a panel scan controller configured to control operation of the driver circuit and the sensing circuit to implement panel scanning to sequentially obtain a series of sets of digital samples at a panel scan frequency, the individual sets of digital samples corresponding to a plurality of locations of the touch screen;

a noise tracker configured to compute a first set of statistics corresponding to the digital samples from the analog-to-digital converter and a second set of statistics corresponding to the filtered digital samples from the digital low pass filter; and a noise shaper configured to selectively adjust at least one of the sampling frequency of the analog-to-digital converter and the panel scan frequency of the panel scan controller if the first and second sets of statistics indicate the presence of noise aliased into the pass band of the digital low pass filter.

2. The controller of claim 1, wherein the noise tracker is configured to:
compute values of the first and second sets of statistics for individual nodes of the touch screen for a plurality of panel scans;
compare values of the first set of statistics with a first threshold value;
compare values of the second set of statistics with a second threshold value; and
cause the noise shaper to selectively adjust the at least one of the sampling frequency and the panel scan frequency if, for a given one of the individual nodes of the touch screen, the corresponding value of the first set of statistics is greater than the first threshold value and the corresponding value of the second set of statistics is greater than the second threshold value.

3. The controller of claim 2, wherein the noise tracker is configured to:
compute the first and second sets of statistics as standard deviation values of node values for individual nodes of the touch screen for the plurality of panel scans;
compare standard deviation values of the first set of statistics with a first threshold value;
compare standard deviation values of the second set of statistics with a second threshold value; and
cause the noise shaper to selectively adjust the at least one of the sampling frequency and the panel scan frequency if, for a given one of the individual nodes of the touch screen, the corresponding standard deviation value of the first set of statistics is greater than the first threshold value and the corresponding standard deviation value of the second set of statistics is greater than the second threshold value.

4. The controller of claim 2, wherein the first and second threshold values are the same.

5. The controller of claim 4, wherein the noise tracker is configured to:
repeat the computation of the first and second sets of statistics and the respective comparison thereof with the first and second threshold values;
selectively repeat causing the noise shaper to adjust the at least one of the sampling frequency and the panel scan frequency based on the threshold comparisons; and
discontinue causing the noise shaper to adjust the at least one of the sampling frequency and the panel scan frequency if a predetermined number of values for the at least one of the sampling frequency and the panel scan frequency have been tried without changing the results of the threshold comparisons.

6. The controller of claim 5, wherein the noise tracker is configured to:
selectively adjust the first and second threshold values if a predetermined number of values for the at least one of the sampling frequency and the panel scan frequency have been tried without changing the results of the threshold comparisons; and
discontinue causing the noise shaper to adjust the at least one of the sampling frequency and the panel scan frequency if a predetermined number of values for the at least one of the sampling frequency and the panel scan frequency have been tried for different first and second threshold values without changing the results of the threshold comparisons.

7. The controller of claim 2, wherein the first and second threshold values are individually adjustable.

8. The controller of claim 2, wherein the noise tracker is configured to:
repeat the computation of the first and second sets of statistics and the respective comparison thereof with the first and second threshold values;
selectively repeat causing the noise shaper to adjust the at least one of the sampling frequency and the panel scan frequency based on the threshold comparisons; and
discontinue causing the noise shaper to adjust the at least one of the sampling frequency and the panel scan frequency if a predetermined number of values for the at least one of the sampling frequency and the panel scan frequency have been tried without changing the results of the threshold comparisons.

9. The controller of claim 8, wherein the controller is configured to notify the host system if the predetermined number of values for the at least one of the sampling frequency and the panel scan frequency have been tried without changing the results of the threshold comparisons.

10. The controller of claim 2, wherein the noise tracker is configured to cause the noise shaper to selectively adjust the sampling frequency of the analog-to-digital converter if, for a given one of the individual nodes of the touch screen, the corresponding value of the first set of statistics is greater than the first threshold value and the corresponding value of the second set of statistics is greater than the second threshold value.

11. The controller of claim 2, wherein the noise tracker is configured to cause the noise shaper to selectively adjust the panel scan frequency of the panel scan controller if, for a given one of the individual nodes of the touch screen, the corresponding value of the first set of statistics is greater than the first threshold value and the corresponding value of the second set of statistics is greater than the second threshold value.

12. The controller of claim 1, wherein the noise tracker is configured to repeat the computation of the first and second sets of statistics, and wherein the noise shaper is configured to discontinue adjusting the at least one of the sampling frequency and the panel scan frequency if a predetermined number of values for the at least one of the sampling frequency and the panel scan frequency have been tried without changing the indication by the statistics of the presence of noise aliased into the pass band of the digital low pass filter.

13. The controller of claim 12, wherein the controller is configured to notify the host system if the predetermined number of values for the at least one of the sampling frequency and the panel scan frequency have been tried without changing the results of the threshold comparisons.

14. The controller of claim 1, wherein the noise tracker is configured to compute the first and second sets of statistics as standard deviation values of node values for individual nodes of the touch screen for the plurality of panel scans, and wherein the noise shaper is configured to selectively adjust the at least one of the sampling frequency and the panel scan frequency if the first and second sets of statistics indicate the presence of noise aliased into the pass band of the digital low pass filter.

15. The controller of claim 1, wherein the noise tracker is configured to cause the noise shaper to selectively adjust the sampling frequency of the analog-to-digital converter if the first and second sets of statistics indicate the presence of noise aliased into the pass band of the digital low pass filter.

16. The controller of claim 1, wherein the noise tracker is configured to cause the noise shaper to selectively adjust the panel scan frequency of the panel scan controller if the first and second sets of statistics indicate the presence of noise aliased into the pass band of the digital low pass filter.

17. The controller of claim 1, wherein the noise tracker is configured to:
compute a first spatial statistic of the first set of statistics corresponding to a plurality of the nodes of the touch screen for a single panel scan;
compute a second spatial statistic of the second set of statistics corresponding to the plurality of the nodes of the touch screen for the single panel scan;
compare the first spatial statistic with a first threshold value;
compare second spatial statistic with a second threshold value; and
cause the noise shaper to selectively adjust the at least one of the sampling frequency and the panel scan frequency if, for a given panel scan of the touch screen, the first spatial statistic is greater than the first threshold value and the second spatial statistic is greater than the second threshold value.

18. A touch screen controller, comprising:
an analog circuit operative to provide excitation signals to a connected touch screen and to receive input signals from the connected touch screen;
an analog-to-digital converter sampling input signals received by the analog circuit;
a digital low pass filter filtering digital samples from the analog-to-digital converter;
a digital processing circuit comprising means for detecting whether high frequency noise is aliased into a pass band of the digital low pass filter, and means for selectively adjusting one or both of a sampling frequency of the analog-to-digital converter and a panel scan frequency of the touch screen controller to facilitate reduction in detected aliasing of the high frequency noise into the pass band of the digital low pass filter.

19. A method for mitigating aliasing of high frequency noise in a touch screen controller, the method comprising:
sequentially obtaining a series of sets of digital samples of input signals from a connected touch screen at a panel scan frequency using an analog-to-digital converter operating at a sampling frequency;
filtering the digital samples using a digital low pass filter with a pass band defined by a cutoff frequency;
computing a first set of statistics corresponding to the digital samples from the analog-to-digital converter;
computing a second set of statistics corresponding to the filtered digital samples from the digital low pass filter; and
selectively adjusting the sampling frequency and/or the panel scan frequency if the first and second sets of statistics indicate the presence of noise aliased into the pass band of the digital low pass filter.

20. The method of claim 19, comprising:
comparing the first set of statistics with a first threshold value;
comparing the second set of statistics with a second threshold value; and
selectively adjusting the sampling frequency and/or the panel scan frequency if, for a given one of the individual nodes of the touch screen, a corresponding value of the first set of statistics is greater than the first threshold value and a corresponding value of the second set of statistics is greater than the second threshold value.

* * * * *